United States Patent Office 3,329,981
Patented July 11, 1967

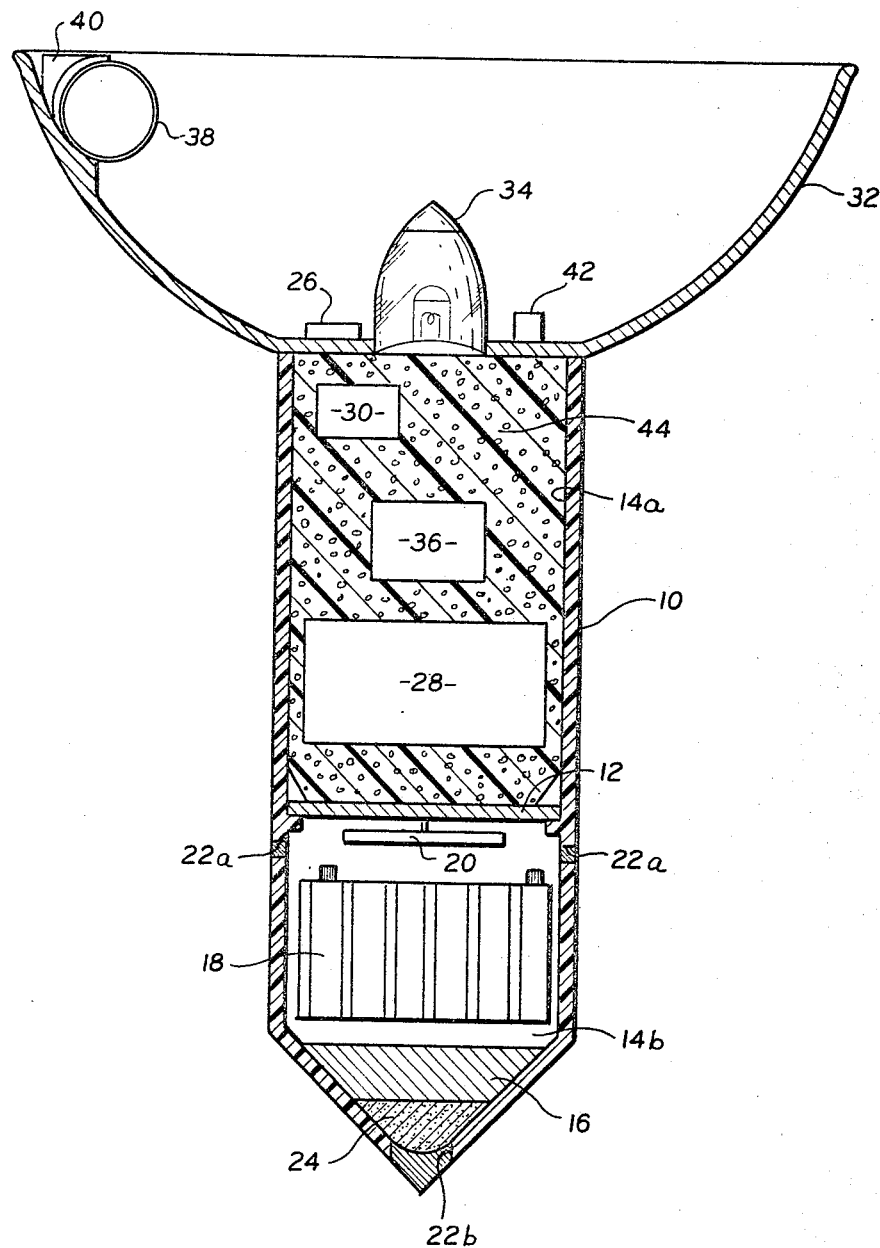

3,329,981
SIGNALLING BUOY
Joseph A. Orsino, Manhattan Beach, Calif. (702 Via Horcada, Palos Verdes Estates, Calif. 90274)
Filed June 22, 1965, Ser. No. 465,886
4 Claims. (Cl. 9—8.3)

ABSTRACT OF THE DISCLOSURE

A signalling buoy having a water activated rechargeable battery, a signalling device and a solar reflecting means to intensify the light impinging on a solar generator means to recharge the battery.

This invention relates in general to signalling buoys and in particular, to signalling buoys having rechargeable batteries.

During emergencies at sea, especially those due to airplane crashes or ship disasters, it becomes frequently necessary to use signalling buoys which will quickly and unerringly lead rescuers to the scene of the disaster. Generally, signalling buoys containing radio transmitters are used in order to transmit the distress signals at predetermined frequencies to stations adapted to receive such signals and relay them to rescue organizations.

Quite frequently, signalling buoys of the type described, are used in which the radio transmitting unit is powered by means of a sea-water chargeable battery. However, the period of time during which the signal is transmitted by the buoy, is of necessity, limited, due to the depletion of the charge in the battery. Thus, the relatively short period of transmission time for the signal often is of an insufficient duration to permit search and rescue parties to locate the scene of the disaster, particularly where vast or unknown regions are concerned. Generally, there has been no provision in signalling buoys for visual aids such as beacon lights or the like, to facilitate detection by rescuers at night, which would form a component part of the buoy structure. The present invention, therefore, overcomes the foregoing disadvantages through the use of a signalling buoy having an indeterminate life span by utilizing a rechargeable sea-water activated battery or other rechargeable device such as is known in the art, providing constant power to a signal transmitter and to a light source.

Accordingly, it is a general object of the present invention to provide an improved signalling buoy utilizing a rechargeable sea-water activated battery having the capacity to power a signal transmitting unit for an indefinite extended period of time.

It is a more specific object to provide a signalling buoy in which a high level battery charge is sustained in a battery for an indefinite extended period of time by means of a solar generator.

Still another object of the present invention is to provide a signalling buoy having a beacon light component to facilitate visual detection of the buoy at night.

The manner in which these and other objects of this invention will be obtained will become apparent from the following detailed description and drawing, in which the single figure of the drawing is a partly schematic longitudinal cross-section of the signalling buoy with parts in the assembled inoperative position.

As shown in the drawing, the signalling buoy includes a cylindrical casing 10, which may be formed of a waterproof plastic material. The casing 10, is adapted to be partitioned by means of a water-tight bulkhead 12, into two chambers 14a and 14b. In order to assure the vertical positioning of the casing 10, after the signalling buoy is dropped into the sea, a weight 16 is located in the lower end of chamber 14b. A rechargeable sea-water activated battery 18 is positioned in chamber 14b. The battery may be any one of the conventional magnesium-silver chloride types (with excess magnesium) or of the silver peroxide-zinc type. It is also possible to use other rechargeable devices such as are known in the art.

To prevent premature activation or deterioration of battery 18 during storage, a dehumidifier 20 containing a standard moisture absorbent silica gel may be provided in chamber 14b to keep the surrounding atmosphere at an acceptable level of atmospheric moisture freeness. Activation of the battery 18 after submersion of the signalling buoy in sea-water is accomplished by providing openings 22a and 22b in the wall of casing 10 about chamber 14b. During storage and prior to the use of the signalling buoy, the openings 22a and 22b are sealed by means of sea-water soluble plugs or tablets which will dissolve when the buoy is submerged, thus permitting sea water to enter the chamber 14b thereby activating battery 18. The lower opening 22b will permit sea water to enter whereas the upper openings 22a will permit the entrapped air in chamber 14b to escape. A standard dyemarker 24 may be located in chamber 14b to aid in the visual detection of the signalling buoy after submersion in the sea.

The battery 18 may be recharged repeatedly and as required through the provison of a solar generator 26 attached to the upper portion of casing 10. Energy is imparted to the solar generator by day or sunlight thus enabling it to sustain and replenish the battery charge for an indeterminate extended period of time.

Chamber 14a is of a water-tight construction and contains the electrical components of the signalling buoy. These components include a radio transmitter 28 connected to and activated by the battery 18. To determine the need for battery recharge, a logic circuit 30 is also located in chamber 14a and connected to the radio transmitter 28 and the solar generator 26.

A solar reflector 32 is attached to the top portion of casing 10 in order to intensify the amount of light impinging on the solar generator 26. Solar reflector 32 may be in the shape of a shallow dish to generate maximum light ray reflection. A beacon light 34 is attached to the casing 10, preferably within the confines of the solar reflector 32, and connected to derive power from battery 18. Beacon light 34 is also connected to the logic circuit 30, the latter of which is adapted to determine the amount of power to be supplied to the beacon light by the battery 18, depending upon whether it is day or night. The logic circuit 30 also apportions the power between the beacon light 34 and the radio transmitter 28 to prevent undue battery drainage. A further function of the logic circuit is to determine when the charge on the battery 18 has depleted to the point of warranting recharging by the solar generator 26.

In order to impart a predetermined signal pattern to the signals emanating from the radio transmitter 28, an encoder 36 is located in chamber 14a. The encoder may simply form the signal pattern emanating from the radio transmitter so that it consists of a simple SOS or SSS, or it may be more elaborate and sophisticated to provide detailed information regarding the position of the signalling buoy. The transmitting range of the signalling buoy and its signalling frequency may be extended by means of an antenna 38 attached to the solar reflector 32. The antenna 38 is a resilient wire coiled for compact storage when not in use by means of an antenna retainer 40, which releases and permits uncoiling of the antenna 38 through short-circuiting of its electrical connections when the battery 18 is activated by sea water.

Visual determination of the battery charge condition is afforded by providing a battery condition indicator 42 attached to the casing 10 or solar reflector 32. A condition reflecting a low battery charge, or a dead battery, may be observed through a color change or discoloration of the battery condition indicator 42.

To prevent damage to the various components, as for example, radio transmitter 28, encoder 36 and logic circuit 30 positioned in chamber 14a when the signalling buoy is dropped into or submerged in the sea, the space surrounding these components may be filled with a foam material 44, such as polyurethane foam. The polyurethane foam also absorbs any moisture in the air to protect the electrical components in chamber 14a from possible damage due to water seepage, and adds buoyancy to the upper portion of the signalling buoy.

While particular embodiments of this invention are shown above it will be understood that it is subject to variations and modifications without departing from its broader aspects.

What is claimed is:

1. A signalling buoy adapted to be dropped into the sea comprising a casing having a weighted lower end for vertical positioning in the water, bulkhead means partitioning said casing into an upper fluid-tight compartment and into a lower compartment, signal transmitting means in said upper compartment, a rechargeable sea-water activated battery in said lower compartment having its terminals connected to said signal transmitting means to provide power thereto upon activation by sea-water, a solar generator means externally attached to the upper portion of said casing and connected to said battery, and a solar reflecting means attached to the upper portion of said casing intermediate to the outer surface thereof and said solar generator means to thereby intensify the amount of light impinging on said solar generator means, whereby exposure of said solar generator means to light will recharge the battery to provide continuous power to said signal transmitting means.

2. A signalling buoy adapted to be dropped into the sea comprising a casing having a weighted lower end for vertical stabilizing in the water, bulkhead means partitioning said casing into an upper fluid-tight compartment and into a lower compartment, a rechargeable sea-water activated battery in said lower compartment, signal transmitting means in said upper compartment connected to said battery to derive power therefrom upon activation of said battery by sea-water, encoding means in said upper compartment adapted to impart a predetermined pattern to the signal emanating from said signal transmitting device, light source means attached to upper portion of said casing and connected to said battery, a solar generator attached to said casing adjacent to the light source means and adapted to be exposed to solar light for recharging said battery, and a solar reflecting means attached to said casing intermediate to the latter and said solar generator to thereby intensify the amount of solar light impinging on said solar generator.

3. A signalling buoy as defined in claim 2, including a logic circuit positioned in said upper compartment, said logic circuit being adapted to control the intensity of said light source, and determine the degree of charge of said battery.

4. A signalling buoy as defined in claim 2, including indicating means mounted on said casing affording visual indication as to the charged condition of said battery.

References Cited

UNITED STATES PATENTS

| 1,669,055 | 5/1928 | Hogg | 9—8.3 |
| 2,904,612 | 9/1959 | Regnier | 136—89 |
| 2,919,298 | 12/1959 | Regnier et al. | 136—89 |
| 3,061,719 | 10/1962 | Shattuck | 9—8.3 X |
| 3,132,322 | 5/1964 | Maes | 9—8 X |
| 3,181,135 | 4/1965 | Zoglio. | |
| 3,222,535 | 12/1965 | Engelhardt | 307—66 |

MILTON BUCHLER, *Primary Examiner.*

T. MAJOR, *Assistant Examiner.*